United States Patent

Alameda

[19]

[11] Patent Number: 5,130,152
[45] Date of Patent: Jul. 14, 1992

[54] FRESH PRODUCE PACKING ASSEMBLY AND METHOD

[75] Inventor: Robert Alameda, Northport, Wash.
[73] Assignee: Alameda Development Corp., Colbert, Wash.
[21] Appl. No.: 566,755
[22] Filed: Aug. 14, 1990
[51] Int. Cl.$^5$ .............................................. B65D 85/00
[52] U.S. Cl. ....................................... 426/106; 47/84; 229/112; 229/120; 426/124; 426/392; 426/419; 426/506; 426/524
[58] Field of Search .............. 47/84; 426/106, 410, 426/112, 402, 411, 419, 124; 383/103; 206/205; 229/120, 112, 113

[56] References Cited

U.S. PATENT DOCUMENTS

| | | | |
|---|---|---|---|
| 1,360,024 | 11/1920 | Robichon | 426/132 |
| 1,572,259 | 2/1926 | Woods | 426/132 |
| 1,708,253 | 4/1929 | Bell et al. | 426/506 |
| 1,801,194 | 4/1931 | Dovre | 99/536 |
| 2,215,446 | 9/1940 | Wilson | 426/270 |
| 2,413,129 | 12/1946 | Wilson | 426/109 |
| 2,431,063 | 11/1947 | McGahey | 426/106 |
| 2,698,804 | 1/1955 | Crisafulli et al. | 426/324 |
| 3,450,542 | 6/1969 | Badran | 426/124 |
| 3,546,327 | 12/1970 | Ruda | 383/103 |
| 3,754,642 | 8/1973 | Stidolph | 47/84 |
| 3,849,581 | 11/1974 | Kubu | 426/324 |
| 3,863,829 | 2/1975 | Merrill | 426/106 |
| 3,973,356 | 8/1976 | Schacht | 47/84 |
| 4,105,152 | 8/1978 | Elward | 229/120 |
| 4,127,228 | 11/1978 | Hall | 229/120 |
| 4,564,316 | 1/1986 | Jes | 229/120 |

FOREIGN PATENT DOCUMENTS

| | | | |
|---|---|---|---|
| 0734795 | 5/1966 | Canada | 426/124 |
| 0111635 | 12/1928 | Fed. Rep. of Germany | 383/103 |
| 2802849 | 7/1978 | Fed. Rep. of Germany | 383/103 |
| 0247146 | 7/1987 | Fed. Rep. of Germany | 47/84 |
| 2582625 | 12/1986 | France | 383/103 |
| 0418682 | 10/1934 | United Kingdom | 426/402 |

*Primary Examiner*—Donald E. Czaja
*Assistant Examiner*—Jean L. Aberle
*Attorney, Agent, or Firm*—Flehr, Hohbach, Test, Albritton & Herbert

[57] ABSTRACT

A fresh produce packing assembly and method for storing and transporting fresh produce. The produce packing assembly includes a hollow container having a liquid collection volume therein defined by a liquid impervious device and a passageway providing for liquid communication between the interior and exterior of the container. Produce pieces are positioned in the container and liquid, usually water, is added to the container for retention in contact with a portion of the produce positioned in the collection volume. The produce packing method includes the steps of placing produce pieces within a package having a liquid collection volume, closing the package to secure the pieces inside, introducing a liquid into the package for accumulation within the collection volume, and draining any liquid exceeding the amount retained by the collection volume from the interior of the container through the passageway.

14 Claims, 3 Drawing Sheets

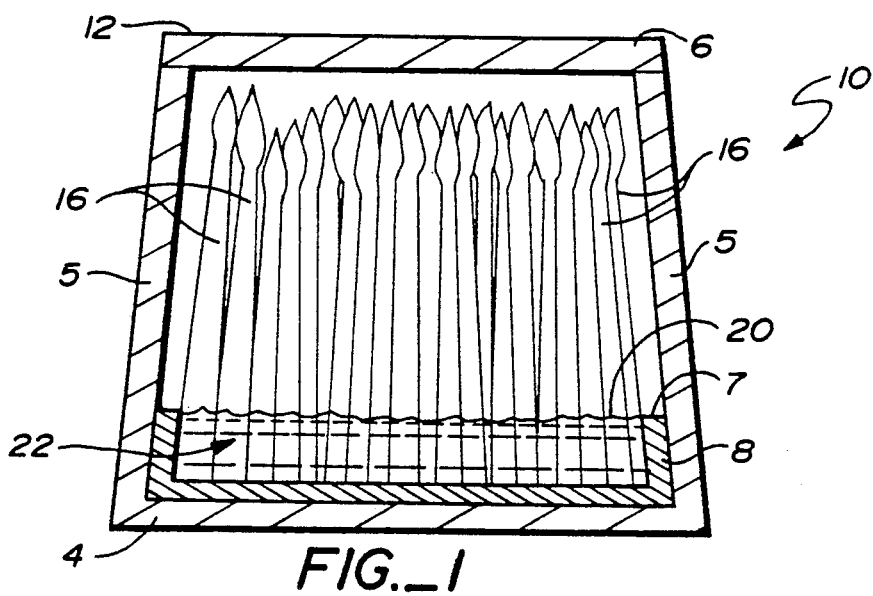
FIG._1
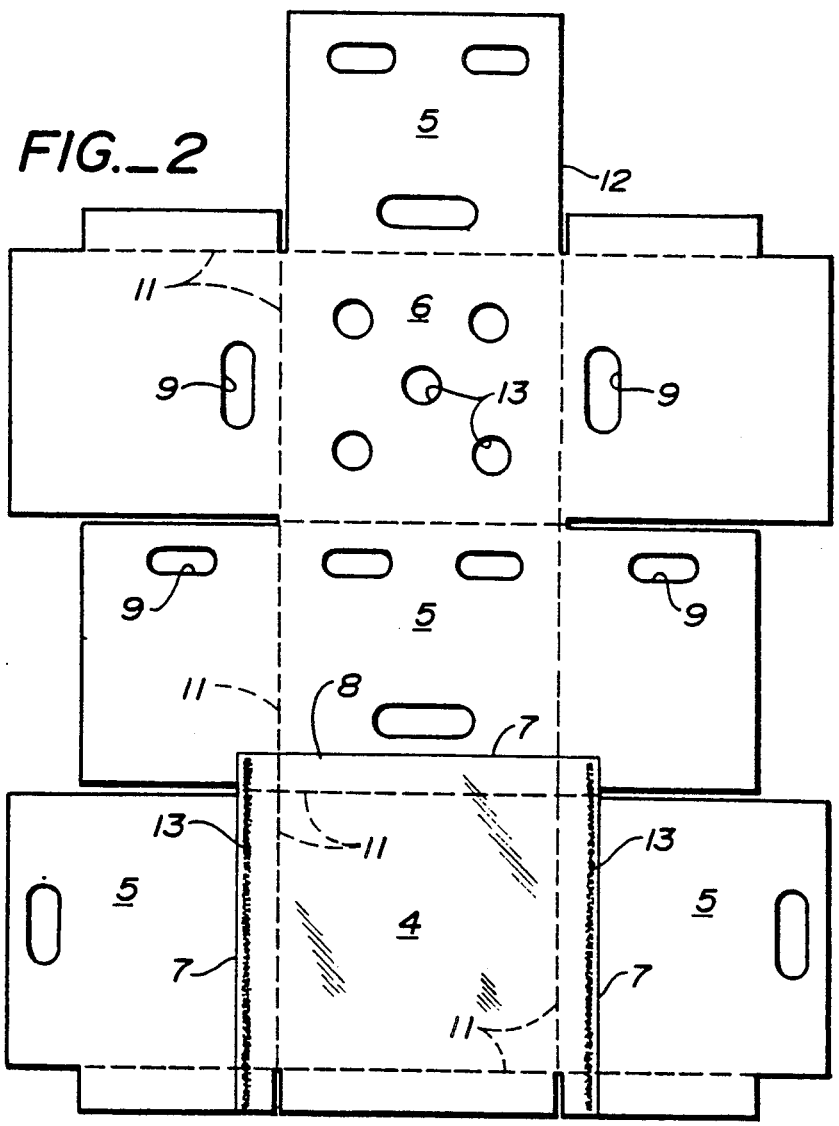
FIG._2

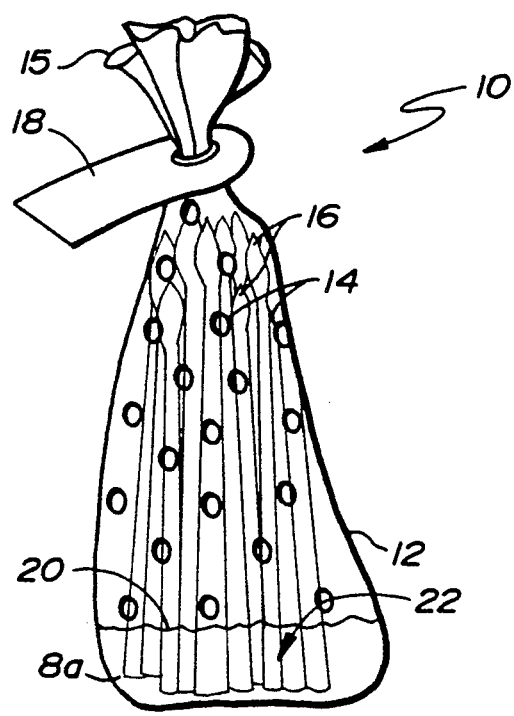
FIG._3
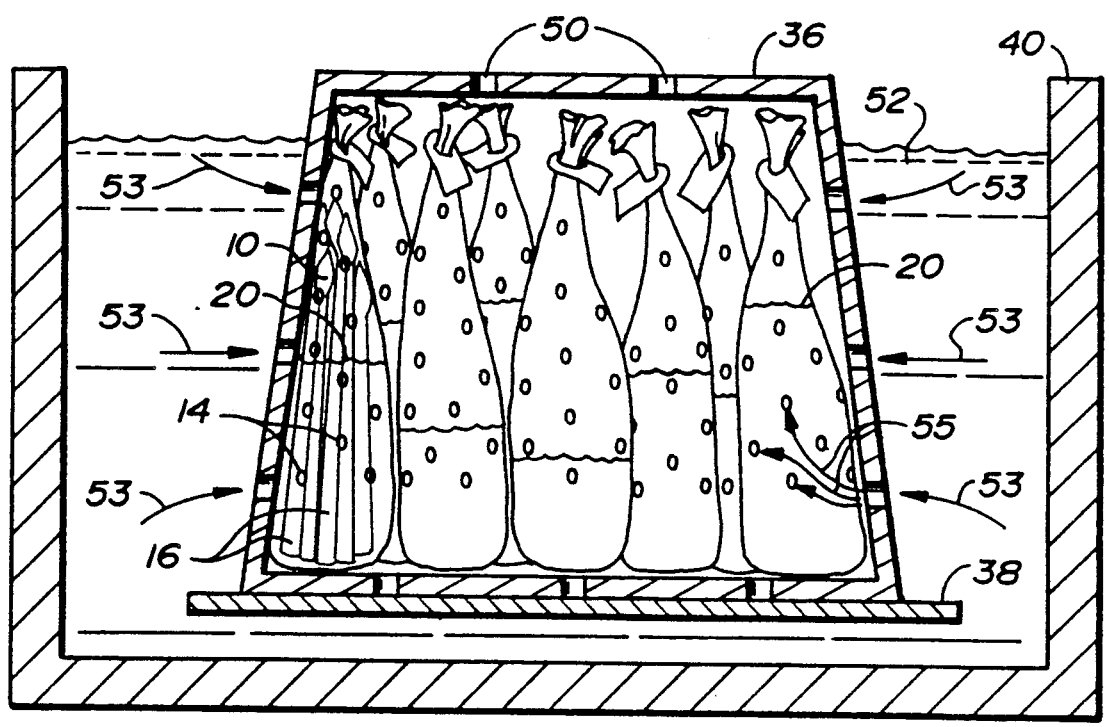
FIG._5

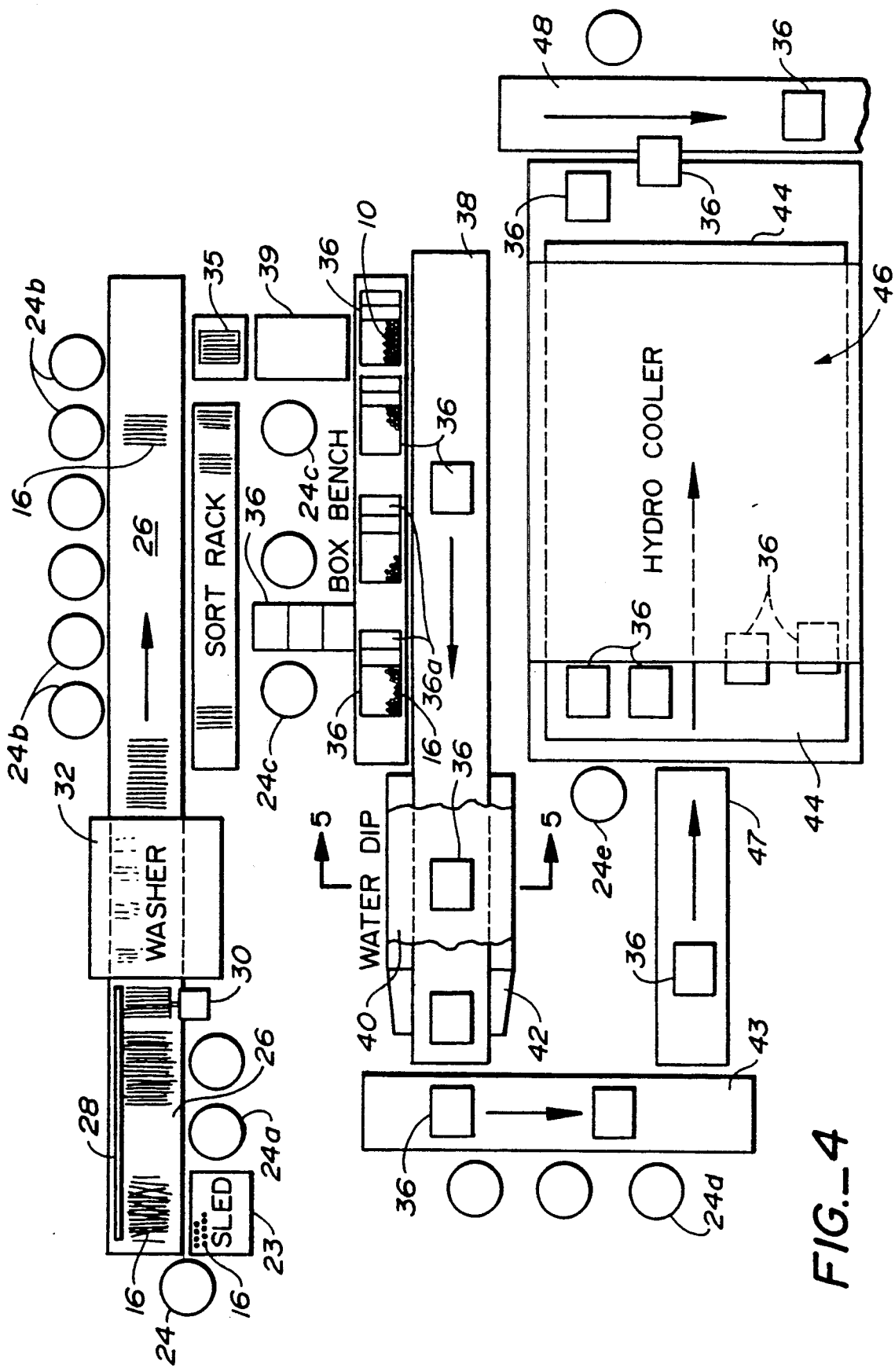
FIG._4

5,130,152

FRESH PRODUCE PACKING ASSEMBLY AND METHOD

TECHNICAL FIELD

In general, the present invention relates to a packing assembly and method for packing fresh produce. More particularly, the present invention relates to a packing assembly and method which may be used for transportation and storage of asparagus.

BACKGROUND ART

The fresh produce which is available to the consumer in the supermarket has been harvested, packed in storage cartons, and shipped from the fields. Unless the consumer resides in or near an agricultural community, the produce found in the supermarket has been shipped from fields which are miles away. Transporting produce grown on the west coast of the United States to the east coast, for example, takes several days, and the produce can arrive in a stressed or poor condition. Because of the long trip, the shelf life is substantially reduced and the produce will be in a marketable condition only for a short time. Thus, the quality and availability of many kinds of produce in east coast supermarkets is much worse than in the west coast supermarkets. Various steps are taken to attempt to improve the appearance and quality of produce subjected to extensive transportation. During the packing process, the produce is washed and often sprayed with cool water. A minimal amount of this water remains in the storage carton and is absorbed by the produce. Some packets place an absorbent pad soaked with cool water in the shipping carton to increase the amount of moisture available to the produce. While this small amount of liquid improves the quality of the shipped produce to nearby destinations, the liquid only lasts for a short period of time and has little effect in cross-country shipment. Produce is often shipped in refrigerated trucks and railcars, but refrigeration is expensive and is not entirely effective in preventing degradation of quality.

Since in many instances the produce may be stored in the shipping container for several days because of shipping delays, extended transportation time, and crowded produce bins, a shipping or produce packing assembly which is capable of extending the useful life and enhancing produce quality is highly desirable. Similarly, a method which efficiently increases the appearance and quality of the produce in remote markets has widespread usefulness.

Accordingly, a primary object of the present invention is to provide a packing system for fresh produce which enables the produce to be shipped, stored and arrive at remote marketplaces in better condition or the consumer.

Another object of the present invention is to provide a packing system which will lengthen the shelf life of fresh produce.

A further object of the present invention is to provide packaging for the transportation, storage, and marketing of fresh produce which enhances the freshness and appearance of the product to the consumer.

A more general object of the present invention is to provide a packing apparatus and method for fresh produce which enhances the quality of produce after a period of several days.

The assembly and method of the present invention has other objects and features of advantage which will become apparent from and are set forth in more detail in the description of the Best Mode Of Carrying Out The Invention and the accompanying drawing.

DISCLOSURE OF THE INVENTION

The produce packing assembly of the present invention includes a hollow container having a wall for holding fresh produce. The improvement in the packing assembly comprises, briefly, the container having a liquid collection volume for retaining a significant volume of a liquid and a passageway allowing excess liquid to flow from the interior of the container to the exterior. A plurality of pieces of produce are placed in the interior of the container with a portion of the produce pieces positioned within the collection volume. A significant quantity of liquid, such as water, is retained within the collection volume and in contact with the portions of the produce to thereby maintain the freshness of the produce over an extended period of time during transport or storage.

In another aspect of the present invention, a produce packing method is provided having the steps of depositing the produce in a storage container, and closing the storage container for transportation. The improvement in the method includes, briefly, the steps of providing a liquid impervious portion of the storage container which forms a liquid collection volume at the bottom of the container, introducing a liquid into the storage container to fill the liquid collection volume, and draining any excess liquid above the collection volume from the interior of the storage container.

BRIEF DESCRIPTION OF THE DRAWINGS

Additional objects and features of the present invention will be more apparent from the following detailed description and the appended claims, when taken in conjunction with the drawing, in which:

FIG. 1 is a front elevation view, in cross section, of a fresh produce containment assembly constructed in accordance with the present invention.

FIG. 2 is a top plan view of the container of FIG. 1 prior to folding the container to the shape as shown in FIG. 1.

FIG. 3 is an alternative embodiment of a fresh produce containment assembly constructed in accordance with the present invention.

FIG. 4 is a top plan schematic diagram showing a fresh produce packing line incorporating the method of the present invention.

FIG. 5 is a front elevation view, taken in cross section substantially along the plane of line 5—5 in FIG. 4, depicting a fresh produce containment assembly in accordance with FIG. 3 and illustrating the method of the present invention.

BEST MODE OF CARRYING OUT THE INVENTION

Reference now will be made in detail to the preferred embodiments of the invention, which are illustrated in the accompanying FIGURES. Turning now to the drawings, wherein like components are designated by like reference numerals throughout the various figures, attention is directed to FIGS. 1 and 3.

Fresh produce packing or containment assemblies, generally designated 10, which are constructed in accordance with the present invention, are shown in FIGS. 1 and 3. Packing assembly 10 includes a hollow container 12 with walls formed to contain a plurality of pieces of fresh produce 16 for transport and/or storage. In the form of the invention in FIG. 1, container 12 is a composite carton or box-like container including relatively rigid, self-supporting walls which will support, as well as contain, produce. In the form of the invention shown in FIG. 3 container 12 of packing assembly 10 is a flexible plastic bag which contains the produce when upper end 15 is secured by an end-closure 18. In either case container 12 can be used to handle, transport and/or store produce pieces 16.

In order to greatly enhance the freshness of produce stored and transported by packing assembly 10, container 12 includes liquid impervious means, such as liner 8 in the box of FIG. 1, or an integrally formed imperforate portion 8a in the bag of FIG. 3, which defines therein a liquid collection volume 22 at bottom 4 of the container. Since it is not desirable to transport an unnecessary amount of liquid, and since some produce can be adversely affected by prolonged storage while totally immersed in a liquid such as water, packing assembly 10 further preferably includes passageway means, such as apertures 14 in the bag of FIG. 3 and upper edge 7 of liner 8 and pores (not shown) in the carton walls of the box of FIG. 1. Such passageway means permits communication of liquid above volume 22 from the interior of container 12 to the exterior of the container.

As will be described in detail below, therefore, container 12 can be filled with a liquid, such as water, and the excess, that is, the volume above volume 22 will drain out of the container. Liner 8, or imperforate wall 8a, in the bottom of the container will trap or retain a substantial volume of water which then can be used to maintain the freshness of produce packaged by the packing assembly and in contact with the retained water.

Packing assembly 10 preferably is employed to ship and store relatively fragile and yet compact produce which will benefit from continuing liquid immersion. Asparagus is particularly well suited for transport and storing using the packing assembly of the present invention. Asparagus has a relatively uniform diameter over its length. It has a short shelf life, sells for a premium price, and will significantly benefit from immersion of its butt ends in water during storage. Under some conditions, asparagus actually will continue to grow after cutting if stored in the packing assembly of the present invention. It will be understood, however, that other kinds of produce also are candidates for the present packing assembly. Thus, celery, carrots, rhubarb, among others, may benefit to varying degrees from the present apparatus and method.

In the preferred application asparagus spears 16 are positioned or held within container 12, with their butt ends resting in liquid collection volume 22. A quantity of liquid, preferably water or water with a nutrient and/or preservative, is retained within liner 8 or imperforate bag bottom 8a, and the water is available for absorption by the asparagus spears positioned in collection volume 22. While in contact with the water, the asparagus spears will absorb the liquid through capillary action and in some cases, even continue to grow.

The collection volume, which is defined by liner 8 and bag portion 8a, may contain an amount of liquid selected to correspond to the transportation or storage time period which the produce must undergo. Volume 22 could be larger for asparagus destined for New York than for those destined for Texas. Thus, asparagus spears shipped completely, or only partially, across the United States in containment assembly 10 with water in volume 22 will arrive in good condition and will have a significantly extended shelf life.

The composite box or carton-like container of FIG. 1 preferably is formed of a corrugated cardboard which is impregnated with a resin, plastic or other material to prevent its breakdown when contacted with water. Such cartons are well known in the produce packing industry and have been employed for years in the shipping of asparagus. Such conventional asparagus shipping cartons, however, do not contain a liner 8 defining a water retention volume 22. Instead, conventional asparagus shipping cartons are not capable of retaining significant volumes of water since seams, openings in the carton walls and cardboard inherent porosity causes the cartons to drain water from their interior.

When a water impervious liner 8 is placed in a conventional asparagus shipping box, however, the drainage inherent in the box structure functions to provide passageway means for drainage of water above edge 7 of the liner from the packing assembly. Thus, the height of the liner side walls and of edge 7 is used to control liquid retention or collection volume 22, with the excess volume draining from the carton without causing breakdown of the mechanical integrity of the carton.

FIG. 2 illustrates container 12 and water impervious liner 8 prior to folding into the self-supporting carton of FIG. 1. Liner 8, which is larger than bottom panel 4 of the container, is placed substantially over the bottom panel. Dotted lines 11 denote the fold lines between side walls 5 and bottom wall or panel 4. In the present embodiment, one or more edges 7 of liner 8 are secured to one or both of side walls 5 by gluing at 13 prior to folding of the carton. Liner 8 conforms with side walls 5 and bottom wall 4 during folding to form collection volume 22 (FIG. 1) within container 12, as shown in FIG. 1. Hand holes 9 and hydro-cooler water inlet holes 13 are provided in top panel 6 and various side panels. The result is an open-topped liquid collection volume 22 in bottom of the shipping box 12 which can be easily packed with asparagus and will readily collect and retain water introduced into the interior of the box.

In the embodiment of packing assembly 10 of FIG. 3, container 12 has a flexible wall or membrane which is formed from a polymeric, or another suitable liquid impervious material, and has a plurality of apertures 14 and a liquid collection volume 22 at the bottom of the container. The size and frequency of spacing of apertures 14 can be varied to allow for the passage of a large amount of water into or out of the container within a short amount of time. Collection volume 22, defined by an area 8a of the flexible container wall at the bottom of the bag having no apertures 14, retains a significant quantity of water within the container. The size of collection volume 22 may be varied by shifting the location, and particularly the height, of apertures 14 which determine the location of water line 20. Thus, by a slight and inexpensive modification in the manufacture of the bag containers, packing assembly 10 may retain varying amounts of water.

A pre-selected number or weight of asparagus spears 16 are contained within bag container 12, which has its upper end 15 securely closed by closure tab 18. A butt portion of each of asparagus spears 16 rests in collection volume 22, which preferably is initially filled with water. In this embodiment, bag container 12 typically holds approximately one pound of the asparagus spears, which allows the container of the present invention to act as a convenient marketing or consumer handling device. Thus, bags 12 of asparagus spears 16 with water in them can be placed directly in the grocery store or supermarket display bins, and the consumer can use the bags to carry the bunches of asparagus home. The packaging, as well as the improved quality of produce, enhances the attractiveness and consumer handling of the produce.

An advantage of bag containers 12 is that water may be added to collection volume 22 by the grocer at a later time without disturbing the packaging of asparagus spears 16. The bags, for example, may be dipped into a trough or pool of water to replenish the water. The water will flow through apertures 14 and into bag container 12, and any excess water will drain from container 12 through apertures 14. Thus, the shelf life of the asparagus may be maintained or extended easily by the grocer by periodically adding water to the containers at the supermarket.

Turning now to FIG. 4, a schematic diagram showing a method for packing fresh produce designed according to the present invention is schematically depicted. For convenience, the method of the present invention will be described in conjunction with the embodiment of containment assembly 10 as illustrated in FIG. 3. The composite carton shown in FIG. 1, however, or additional embodiments of the containment assembly of the present invention, may be substituted for the assembly of FIG. 3 in teh present method.

After being picked in the field, the asparagus spears qre brought into the packing area on a field sled 23. Asparagus spears 16 are placed on conveyor belt 26 with the top or flower portion against guide bar 28 by an unloader 24. The asparagus are straightened and culled by workers 24a. After a cutting mechanism 30 ensures that the asparagus spears fall within a defined maximum length, asparagus spears 16 pass through washer 32.

Once they have been washed, asparagus spears 16 are sorted by sorters 24b according to their diameter. At the left end of conveyor 26 sorters 24b merely place sorted asparagus in a sort rack 34. Boxers 24c remove the asparagus and place the same in boxes or cartons 36 on box bench 37. Personnel 24c boxing the asparagus may place the asparagus in a bag or add a rubber band to band the asparagus in bunches before placing the bags or bunches in boxes, or they may simply pack the asparagus loosely in the boxes. When box 36 is filled, the boxer closes the box lid 36a and places the filled box on conveyor 38.

As thus far described the asparagus packing line of FIG. 4 is identical to lines used with convention asparagus shipping boxes or cartons.

At the right end of conveyor 26 an alternative semi-automated packing sequence is illustrated. Sorter 24b places sorted asparagus into a tilting scale 35. When a predetermined weight is reached, for example, one pound, the scale tilts and slides the weighed asparagus bunch into an automatic bagging machine 39. Bagging machine 39 holds the bag in a distended position to receive the asparagus and then closes the bag with a band or closure tab 18. The closed bag is then placed automatically, or by a worker 24c, into box 36. Again, this bagging alternative is known in the produce industry and does not form a novel portion of the present invention.

In the improved method of the present invention the bags used to bag asparagus, either manually or by machine, are formed with a plurality of openings 14, as shown in FIG. 3, or the boxes or cartons 36 are provided with liners 8, as shown in FIG. 1. Moreover, in the improved method a liquid, usually water, is added to the composite cartons or perforated bags 12, for example, by immersing the same in water. The water passes into the interior of the improved containers through passageway means, such as apertures 14, or openings 50 in the boxes and substantially fills liquid collection volume 22.

As shown in FIGS. 4 and 5, immersion of the liquid retaining shipping containers of the present invention can be accomplished by transporting boxes 36 by conveyor 38 through a water pool or trough 40. At this time, water fills the shipping box through openings 50 and passes through apertures 14 of bags 12 or down through the open top of box liner 8. At drain area 42 a substantial amount of the excess water, not retained within collection volumes 22 of bags 10, or liner 8, drains from the bags and shipping box 36. At a sealing conveyor 43 boxes 36 are stapled closed by workers 24d and then conveyed by conveyor 47 to a hydro-cooler 46.

Asparagus spears 16 are cooled, as in standard packaging procedures, by moving shipping box 36 onto a wide, slowmoving conveyor belt 44 by worker 24e, and the boxes slowly pass through hydro-cooler 46. While in the hydrocooler, shipping box 36 is sprayed with cool water, some of which will be retained within volumes 22 of any unfilled bags or in liner 8. After shipping boxes 36 leave hydro-cooler 46, a final conveyor belt 48 moves the shipping boxes to either a storage area or a loading dock.

In the present embodiment, collection volume 22 preferably is filled with water by dipping the lined box or the box of bags into a pool of water. Thus, a significant quantity of water is efficiently introduced into the containment volume during the packing process. Alternatively, however, bags 12 or composite carton 12 may be filled by adapting hydro-cooler 42 to apply a sufficient amount of water to shipping box 36 during the cooling process to fill volumes 22. In a further alternative the water may be added to the containers by opening the tops of the bags prior to boxing the bags, or opening the tops of composite cartons 12 prior to sealing the cartons, and filling the containers, preferably to a level above volume 22, with water.

A cross sectional view of a containment assembly 10 passing through water pool 40 of FIG. 4 is schematically shown in FIG. 5. Shipping box 36 passes through water pool 40 on conveyor belt 38. Water 52 passes into shipping box 36, as shown by arrows 53, by means of several holes 50 located on the six sides of the shipping box. As the water fills shipping box 36 it in turn passes through apertures 14 into containers 12, which is also indicated by arrows 55.

As indicated by water lines 20, not all containers 12 are completely filled while shipping box 36 is submersed in water pool 40. However, enough water 52 preferably enters each of containers 12 to fill at least collection volume 22, with the excess water 52 above the lowermost apertures 14 draining out of the bags through the apertures and out of the cartons 36 through holes 50, seams and carton pores. Thus, the fresh produce containment assembly and method of the present invention efficiently provide and retain a significant quantity of water in contact with the produce to sustain the produce during transportation and storage, without adding unnecessarily to the shipping weight or undesirably soaking the entire produce piece during transport. While the preferred embodiment has been discussed in relation to asparagus, other types of produce may be packaged using the present invention. Additionally, a nutrient-enriched liquid may be substituted for or added to the water.

What is claimed is:

1. A produce packing assembly suitable for storing and transporting fresh produce comprising:
   (a) a hollow container having a wall formed to completely surround and contain a plurality of pieces of produce for transport and storage, said wall defining a closeable open upper end for receipt of produce therethrough, said container including liquid impervious means provided at a bottom end thereof, said liquid impervious means defining a liquid collection volume at said bottom end of said container having a size sufficient to retain enough liquid therein for extended transport of produce, and passageway means positioned below said open upper end and above said bottom end, said passageway means having a size for introducing a large amount of liquid into the interior of said container from the exterior of said container in a relatively short period of time and communicating any excess liquid from the interior of said container above said collection volume to the exterior of said container;
   (b) a plurality of produce pieces positioned in and surrounded by said container with a lower portion thereof positioned in said liquid collection volume; and
   (c) a quantity of said liquid contained in said liquid collection volume and contacting said produce pieces for absorption of said liquid by said produce pieces during transport and storage.

2. The produce packing assembly of claim 1 wherein, said liquid impervious means is provided by an open topped liquid impervious liner mounted adjacent to said wall at said bottom of said container, and said passageway means is provided by an upper edge of said open topped liquid impervious liner.

3. The produce packing assembly of claim 1 wherein, said liquid impervious means and said wall are integrally formed at said bottom of said container.

4. The produce packing assembly of claim 1 wherein, said passageway means includes a plurality of apertures within said wall, said passageway means opening into the interior of said container, said apertures being sufficiently large in size to provide for the passage of a substantial amount of liquid through said apertures into the interior of said container in the short period of time during which said container is traveling on a conveyor belt passing through a trough of water.

5. The produce packing assembly of claim 1 wherein, said passageway means includes a plurality of apertures within said wall, said apertures being configured and positioned to allow for the movement of a volume of said liquid larger than said liquid collection volume into the interior of said container above said collection volume in a relatively short period of time.

6. The produce packing assembly of claim 1 wherein, said liquid impervious means is provided by a plurality of polymeric container each having a liquid impervious wall with a plurality of apertures in said wall above a bottom portion of said polymeric containers, said apertures being of a size sufficient to permit the movement of a substantial amount of liquid between the interior and exterior of said polymeric containers during a brief period of time.

7. The produce packing assembly of claim 6 wherein, a plurality of said pieces of produce are mounted within each of said polymeric container.

8. In a method for packing fresh produce including the steps of assembling a storage container having a wall for containing and supporting said produce pieces, depositing a plurality of produce pieces into said storage container, and closing said storage container to secure and completely contain said produce pieces therein for transport and storage, the improvement in said method for packing comprising the steps of:
   providing a liquid imperious material in said storage container to thereby form a liquid collection volume having a size sufficient to retain enough liquid therein for extended transport of produce defined by said liquid impervious material at the bottom of said assembled storage container;
   introducing a significant amount of liquid into said storage container during a brief period of time for accumulation within said collection volume through a plurality of apertures formed in said storage container; and
   draining any liquid exceeding the amount accumulating within said collection volume from said storage container through said plurality of apertures.

9. The improvement in the method for packing fresh produce of claim 8 wherein,
   said providing step is accomplished by placing said liquid impervious material adjacent to said storage container prior to said assembling step, affixing a portion of said liquid impervious material to said storage container prior to said assembling step and assembling said storage container with said liquid impervious material to form said liquid collection volume at the bottom of said container.

10. The improvement in the method for packing fresh produce of claim 8 wherein,
    said introducing step is accomplished by placing said container on a conveyor belt traveling through a trough of water such that, while said container travels through said trough of water, a significant amount of liquid flows through said apertures and accumulates in said collection volume.

11. The improvement in the method for packing fresh produce of claim 8 wherein,
    said draining step includes allowing said excess liquid to pass through passageway means in said wall of said storage container.

12. The improvement in the method for packing fresh produce of claim 8 wherein,
    said draining step includes allowing said excess liquid to exit from said storage container through a plurality of apertures formed within said wall.

13. In a method for packing fresh produce including the steps of sorting a plurality of produce pieces by size, depositing said produce pieces into a storage container, and closing said storage package thereby securing and completely containing said produce pieces within said storage package, the improvement in said method for packing comprising the steps of:
    (a) selecting a hollow storage container with a wall having a plurality of apertures opening into the interior of said container for quickly passing a large amount of liquid therethrough and having a liquid collection volume of significant size defined by a liquid impervious material at a bottom of said container for retaining said liquid therein;

(b) immersing said container in a liquid and allowing a large quantity thereof to pass through said apertures and into said container in a relatively short period of time; and (c) removing said container from said liquid and allowing any liquid exceeding the amount retained within said collection volume to drain from said container through said apertures.

14. A produce packing assembly suitable for transporting, storing, and marketing fresh produce comprising:

(a) a storage container having a wall with a plurality of apertures extending therethrough;

(b) a plurality of package containers mounted within said storage container, said package containers having a liquid impervious wall formed as a flexible polymeric material and a liquid collection volume partially defined by said wall for retaining liquid therein, said wall having a plurality of apertures configured and positioned for the passage of a significant amount of liquid between the interior of said storage container and the interior of said package containers over a brief period of time;

(c) a plurality of pieces of produce mounted within said package container with a portion thereof positioned within said liquid collection volume, said package container surrounding and completely containing; and (d) a quantity of liquid retained within said liquid collection volume for absorption by said pieces of produce during transport and storage.

* * * * *